(12) United States Patent
Meador et al.

(10) Patent No.: US 8,841,406 B2
(45) Date of Patent: Sep. 23, 2014

(54) BRANCHED ROD-COIL POLYIMIDE—POLY( ALKYLENE OXIDE) COPOLYMERS AND ELECTROLYTE COMPOSITIONS

(75) Inventors: Maryann B. Meador, Strongsville, OH (US); Dean M. Tigelaar, Seven Hills, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 204 days.

(21) Appl. No.: 12/317,232

(22) Filed: Dec. 22, 2008

(65) Prior Publication Data
US 2010/0159335 A1   Jun. 24, 2010

(51) Int. Cl.
| | | |
|---|---|---|
| *C08L 79/08* | (2006.01) | |
| *H01M 6/18* | (2006.01) | |
| *C08G 65/333* | (2006.01) | |
| *H01M 4/137* | (2010.01) | |
| *C08G 65/332* | (2006.01) | |
| *H01M 4/62* | (2006.01) | |
| *H01M 10/0565* | (2010.01) | |

(52) U.S. Cl.
CPC ......... *C08G 65/33306* (2013.01); *H01M 6/181* (2013.01); *C08G 65/33355* (2013.01); *H01M 4/137* (2013.01); *C08G 65/3326* (2013.01); *H01M 10/0565* (2013.01); *Y02E 60/122* (2013.01); *H01M 4/626* (2013.01); *H01M 6/188* (2013.01); *H01M 4/624* (2013.01); *C08L 2205/05* (2013.01); *C08G 2650/50* (2013.01)
USPC .......... 528/338; 523/339; 523/340; 525/423; 528/310

(58) Field of Classification Search
USPC ............ 528/338, 310; 523/339, 340; 525/423
See application file for complete search history.

(56) References Cited

U.S. PATENT DOCUMENTS

| | | | | |
|---|---|---|---|---|
| 4,946,873 | A * | 8/1990 | Carter et al. ................... | 521/185 |
| 6,673,273 | B2 | 1/2004 | Dinhbale et al. .............. | 252/511 |
| 6,734,274 | B2 * | 5/2004 | Suzuki et al. ................... | 528/76 |
| 6,855,433 | B1 | 2/2005 | Meador et al. ............. | 428/473.5 |
| 6,881,820 | B1 | 4/2005 | Meador et al. ................ | 528/338 |
| 2004/0225026 | A1 * | 11/2004 | Mizori et al. ................... | 522/99 |

OTHER PUBLICATIONS

Attached is a three page list of publications Nos. 1-34.

* cited by examiner

*Primary Examiner* — Gregory Listvoyb
(74) *Attorney, Agent, or Firm* — Robert H. Earp, III

(57) ABSTRACT

Crosslinked polyimide-poly(alkylene oxide) copolymers capable of holding large volumes of liquid while maintaining good dimensional stability. Copolymers are derived at ambient temperatures from amine endcapped amic-acid oligomers subsequently imidized in solution at increased temperatures, followed by reaction with trifunctional compounds in the presence of various additives. Films of these copolymers hold over four times their weight at room temperature of liquids such as ionic liquids (RTIL) and/or carbonate solvents. These rod-coil polyimide copolymers are used to prepare polymeric electrolytes by adding to the copolymers various amounts of compounds such as ionic liquids (RTIL), lithium trifluoromethane-sulfonimide (LiTFSi) or other lithium salts, and alumina.

7 Claims, 4 Drawing Sheets

BRANCHED ROD-COIL POLYIMIDE—POLY(ALKYLENE OXIDE) COPOLYMERS AND ELECTROLYTE COMPOSITIONS

ORIGIN OF INVENTION

The invention described herein was made by employees of the United States Government and may be manufactured and used by or for the Government for governmental purposes without the payment of any royalties thereon or therefor.

The invention described herein was made in the performance of work under a NASA contract, and is subject to the provisions of Public LAW 96-517 (35 USC 202) in which the Contractor has elected not to retain title.

BACKGROUND OF THE INVENTION

Field of the Invention

This invention relates to branched rod-coil polyimide-poly (alkylene oxide) (PEO) copolymers that are cured in the solid state at ambient temperatures. More specifically, this invention describes the preparation of branched rod-coil polyimide-PEO copolymers that are cured in the film state at ambient temperatures. Previously patented rod-coil polyimide-PEO polymers required curing at 200° C. On curing, a gel network is formed that is capable of conducting lithium ions within lithium ion batteries. Conductivity comes from the PEO portion, while the imide segments and branching provide dimensional stability. This network is able to hold large amounts of liquid (>400% by wt,), while maintaining good dimensional stability. These liquid additives (such as ionic liquids and carbonate solvents) can significantly aid in the conduction of lithium ions, and in some circumstances increase the battery cycles life.

For example, lithium based polymer batteries for aerospace applications need the ability to operate in temperatures ranging from −70° to +70° C. Current state of the art solid polymer electrolytes (based on amorphous polyethylene oxide, PEO) have acceptable ionic conductivities (10-4 to 10-3 S/cm) only above 60° C.

U.S. patents disclose the synthesis of branched rod-coil polyimides (U.S. Pat. Nos. 6,855,433 and 6,881,820). These polymers, when doped with lithium salt, exhibit excellent dimensional stability, and relatively high ionic conductivity (10-5 S/cm at room temp.). The polymer electrolyte films are made by casting the polyamide-acid prepolymer from a suitable solvent, carefully removing all solvent at low temperatures (<70° C.), and thermally curing the polymer at 200° C. under vacuum to form the polyimide and remove water that is generated in the process (since water is highly reactive toward lithium metal). If the solvent is not completely removed before curing, the film will bubble and cannot be used.

A conductivity of at least 10-3 S/cm at room temperature is needed for practical applications. This conductivity can be achieved if a liquid component is added. However, the thermal curing needed for the patented polymers removes this possibility. It should also be noted that once the patented polymers are cured in the solid state, it becomes insoluble in all organic solvents, meaning the cured polymers cannot be recast. Ionic liquids can be added (which are nonvolatile) to improve conductivity. However, it has been reported (Journal of Power Sources, 2006, 621) that cycle life is improved dramatically when certain organic solvents are added to the ionic liquid. It should also be noted that a branched structure is required for these rod-coil polymers to hold large amounts of ionic liquid. Furthermore, most gel electrolytes for lithium batteries are made from poly(vinylidene fluoride), which is both a less flexible matrix, less environmentally friendly, and likely more expensive to make in the long term.

SUMMARY OF THE INVENTION

This invention describes a series of branched rod-coil polyimide-polyalkylene copolymers that are cured at ambient temperatures so they can retain large amounts of organic solvent. The polymers are made in three distinct steps. First, the dianhydrides are reacted with a polyalkylene oxide i.e. polyethylene oxide (PEO) oligomer that is terminated with primary aliphatic amines on both ends to make the polyimide-organic acid prepolymer. The stoichiometry of the two chemicals is adjusted so a linear polymer is made that is endcapped with an amine on both ends. The solvent must be chosen to solubilize the polymer, have a boiling point preferably between 150° and 200° C., and be inert to lithium metal and other battery components. In the second step the amine-terminated polyamide-acid prepolymer is imidized in solution at increased temperatures. The water generated from this reaction step is removed by azeotropic distillation. In the third step, the appropriate additives are dissolved in the polyimide solution (such as Li salts, metal oxides, ionic liquids and carbonate solvents). A trifunctional molecule is then added to react with the oligomer's amine endcaps at ambient temperatures to form a gel. Gelation time and film properties can be adjusted by changing the length of the polymer chains. Film properties can also be adjusted by altering the dianhydride, PEO chain length, and partially replacing the trifunctional molecule with a difunctional molecule e.g. diisocyanates. The film can either be packaged once gelation occurs, or the reaction solvent can be allowed to evaporate. The reaction solvent should have a boiling point that is ~100° C. lower than cyclic carbonate solvents (e.g. ethylene carbonate and propylene carbonate), and can be preferentially evaporated. However, the reaction solvent also could be inert toward all battery components and therefore would not need to be removed.

The process of this invention provides a polymer gel electrolyte that is easy to fabricate with good dimensional stability. The synthesis is very versatile. Gelation time can be varied from minutes to hours. Polymer consistency can be varied from highly rigid to highly tacky (but strong and stretchy). The imide segments still provide mechanical strength, phase separation, and a completely amorphous polymer in the presence of lithium salts. This new synthetic route adds the dimension of low temperature curing and gelation, and therefore the ability to add organic solvents to increase conductivity. The polymer synthesis offers the flexibility of making a highly conductive electrolyte with either no volatile components of ionic liquid being added, or with the addition of solvent. The advantage of having a battery with no volatile components are safety and high lithium ion conductivity at ambient to high temperatures. The advantages of adding solvents is high lithium ion conductivity at sub-ambient to ambient temperatures.

BRIEF DESCRIPTION OF THE DRAWINGS

The objects and advantages of this invention will become more apparent after a review of the detailed description and accompanying drawings as follows.

Figure 1:
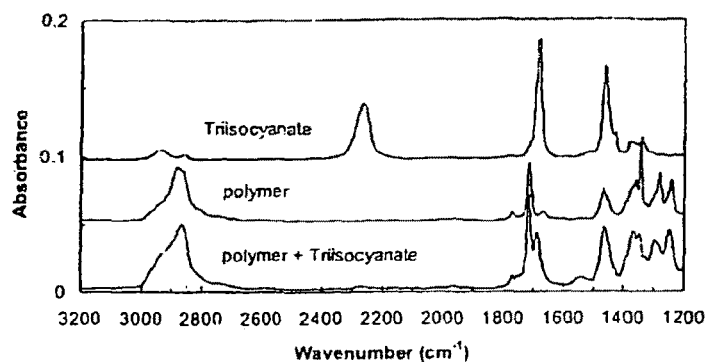
FIG. 1: shows infrared spectra of the triisocyanate, a polymer film without the triisocyanate added, and the polymer film with the triisocyanate added.

Accordingly, it is an object of this invention to provide the composition and process for preparing a highly cross-linked polyimide poly(alkylene oxide) copolymer that is capable of holding large volumes of liquid.

It is another object of this invention to provide branched rod-coil polyimide-poly(alkylene oxide) copolymers that are cured in the film state at ambient temperatures.

It is another object of this invention to provide solid polymer electrolytes derived from cross-linked polyimide poly(alkylene oxide) copolymers.

It is a further object of this invention to provide branched rod-coil polyimide-poly (ethylene oxide) copolymers containing polyimide rod segments and polyethylene oxide coil segments wherein the coil segments allows the copolymer to hold solvents at high temperatures.

DETAILED DESCRIPTION OF THE INVENTION

More specifically, highly crosslinked polyimide-poly(ethylene oxide) copolymers have been synthesized that are capable of holding large volumes of a liquid component while maintaining good dimensional stability. An amine endcapped oligomer was imidized in solution, followed by reaction with trifunctional compounds e.g. triisocyanates or mixtures with di-isocyanates in the presence of desired additives at ambient temperature. Films of these polymers are able to hold over four times their weight, at room temperature, of various ionic liquid (RTIL, lithium compounds e.g. lithium trifluoromethanesulfonimide (LiTFSi), and metal oxides such as alumina nanoparticles. Electrochemical stability of these electrolytes with lithium metal electrodes was studied by galvanic cycling and impedance spectroscopy. Improved cycling stability and decreased interfacial resistance were observed when increasing amounts of RTIL and LiTFSi were added. The addition of small amounts of alumina further decreased interfacial resistance by nearly an order of magnitude. During the course of study of these copolymers, cycling stability increased from <3 hours to >1000 hours at 60° C. and 0.25 mA/cm² current density.

As lithium batteries continue to increase in popularity researchers continue to search for ways to improve battery safety without sacrificing performance. A major safety concern arises from the volatility and flammability of cyclic and acyclic carbonate solvents that are used in most batteries. An ideal replacement would be solid polymer electrolytes, which would permit the use of lithium metal anodes and increase design flexibility, in addition to removing flammability concerns. However, polymer electrolytes appear to have reached an upper conductivity limit of $10^{-4}$ S/cm at room temperature, at least an order of magnitude lower than what is needed for practical use.

Researchers have recently addressed the flammability issue by replacing solvent with room temperature ionic liquids (RTIL'S) as liquid and gel electrolytes. RTIL's are nonvolatile, nonflammable, highly conductive and have a wide electrochemical stability window. Howlett and coworkers report a study of 0.5 mol/kg lithium trifluoromethanesulfonimide (LiTFSi) in N-butyl-N-methylpyrrolidinium trifluoromethanesulfonimide ($P_{14}$), and N-propyl-N-methylpyrrolidinium trifluoromethanesulfonimide ($P_{13}$ Scheme1) as a liquid electrolyte. They report that this solution has a conductivity $>10^{-3}$ S/cm and a stable potential window from −0.6 to 4V vs Li/Li⁺. They also demonstrate high cycling efficiencies in a Li/IL soln/Pt cell at 50° C.

Scheme 1

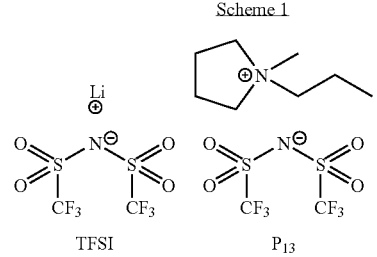

Shin and coworkers studied polymer electrolytes formulated from PEO, LiTFSi, and $P_{13}$. They report stable galvanostatic cycling for their polymer electrolytes between Li electrodes at 60° C. and a current density of 0.2 mA/cm² (3 hr steps). $P_{13}$ alone is reactive with lithium metal. However, when a small amount of LiTFSi is added, a stable interfacial layer is formed that protects $P_{13}$ from further degradation. When PEO is added, the amount of LiTFSi required to maintain interfacial stability increases dramatically, due to coordination of PEO with LiTFSi. They report good cycling stability in P(EO)$_{20}$LiTFSi when ≤100% $P_{13}$ is added (compared to PEO). This equates to a LiTFSi concentration of at least 1.25 mol/kg in $P_{13}$ being required in this system. The authors conclude that below this concentration, "free RTIL" is present, which results in an unstable solid electrolyte interface.

The above results suggest that an improved system may be one in which both the amount of RTIL and lithium salt are increased compared to PEO. The higher volume of liquid would increase conductivity, while more lithium salt would maintain interfacial stability with lithium electrodes. However, it may be difficult to further increase the amount of $P_{13}$ and LiTFSi added to this PEO due to the plasticizing effect of the TFSi anion. Eventually, the electrolyte will become too tacky to be processable. This invention discloses hyperbranched rod-coil polyimide-PEO polymers that are both highly conductive and mechanically stronger than PEO. Unfortunately, an adverse reaction appears to happen when the polymer is cured at 200° C. in the presence of pyrrolidinium salts. To address this issue, this invention discloses a new rod-coil polyimide system that undergoes two different curing steps. In the first step, a primary amine-endcapped poly (alkylene oxide) oligomer is prepared wherein the amide acid groups are then imidized in solution. In the next step, the amine endcaps of the polymer are reacted with triisocyanates at room temperature to form a gel network. During the course of studying these reactions, it was found that this polymer can hold over 4 times it's weight in liquid additives while maintaining good dimensional stability.

In addition, the effects of adding alumina nanoparticles to the RTIL-containing polymer electrolyte were studied. Ba Le and coworkers report an increase in the interfacial stability of polymer electrolytes similar to those made when alumina nanoparticles are added. These polymers are made by the reaction of dihydroxy and diamine terminated PEOs with triisocyanates to form urethane and urea groups, respectively. The authors propose stability is improved by hydrogen bonding of the acidic urea groups to alumina particles, which shields the groups from lithium metal and increases the mechanical strength of the electrolyte. Furthermore, Croce and coworkers have reported that the addition of nanometer-size $TiO_2$ particles to $P(EO)_8LiClO_4$ increases the $Li^+$ transference number from ~0.2 to 0.6. They attribute the increase to an electrolyte modification based on Lewis acid-base interactions between the ceramic surfaces with both the PEO segments and $ClO_4$, increasing the mobility of $Li^+$. Lithium cation transport is then promoted at the boundaries of the ceramic particles. A similar effect may be expected in the polymer electrolyte of this invention where the ceramic particles bind to PEO, thereby increasing lithium ion mobility through the RTIL phase.

The Aeroxide Alu C alumina was provided by Degussa Corporation and dried at 110° C. under vacuum for 24 hours before use. The alumina had a 13 nm average particle size and 100 $m^2/g$ surface area. 2000 MW diamine terminated PEO (XTJ-502) was provided by Huntsman Corp. and used as received. Diglyme (diethylene glycol dimethyl ether) was purchased as anhydrous grade from Aldrich and used as received. Toluene was purchased from Aldrich in HPLC grade and used as received. Benzophenonedicarboxylic acid anhydride (BTDA) was purchased from Aldrich and dried under vacuum at 80° C. overnight. LiTFSi was purchased from 3M dried as 140° C. under vacuum for 12 hours. The triisocyanate, Desmodur N3300A, was provided by Bayer Corporation. $P_{13}$ was synthesized according to a literature procedure.

Polymer Synthesis

The following is an example of the synthesis of an amine end-capped PEO-polyimide with a 3:2 ratio of diamine to dianhydride. 10.88 g (5.440 mmol) XTJ-502 was dissolved in 25 mL diglyme in a round bottom flask equipped with a Dean-Stark trap, reflux condenser, and nitrogen inlet. 1.169 g (3.628 mmol) BTDA was added and the weighing container rinsed with a small amount of toluene. The reaction was stirred overnight at room temperature to form a highly viscous solution. 20 ml toluene was added and the flask was placed in an oil bath. The bath was heated to 165° C. and water was removed from the system as an azeotrope with toluene for 5 hours. The color of the reaction changed from light yellow to light brown during this time. Toluene was then removed from the system through the Dean-Stark trap. The contents of the reaction were immediately transferred into a preweighed jar in a dessicator. The jar was quickly sealed, transferred into a dry box, and weighed to determine the polymer concentration. Solutions were typically around 30% polymer by weight.

Film Preparation

The amount of polymer solution to account for 1 g of polymer was weighed. Lithium salt was then dissolved in the solution, followed by addition of the ionic liquid and alumina. The solution was shaken until it became homogeneous. In solutions where alumina was used, a stir bar was added and the solution was stirred for at least 24 hours. 47 mgs of triisocyanate was dissolved in 1 mL THF. The solutions were combined, shaken for 30 seconds and cast into Teflon dishes. The films were allowed to sit overnight, followed by heating to 70° C. for 2 hours.

Three materials are added to the polymer: LiTFSi, $P_{13}$, and alumina. The amount of RTIL added is expressed as a weight percentage of the polymer (200, 300, or 400%). Lithium salt is expressed as a concentration in $P_{13}$ (0.5, 0.75, or 1.0 mol/kg). Alumina is used as an additive so the other variables remain constant. It is expressed as a percentage of RTIL (5, 10, or 15%). Therefore a film having 400% RTIL, 1.0 mol/kg LiTFSi, and 10% alumina, would contain 1 g polymer, 4.0 g $P_{13}$, 1.14 g LiTFSi, and 0.4 g alumina. The composition of all electrolytes is listed in Table 1.

TABLE 1

| Electrolyte | % $P_{13}$ | [LiTFSi] (mol/kg) | % $Al_2O_3$ |
|---|---|---|---|
| A | 400 | 0.5 | 0 |
| B | 300 | 0.5 | 0 |
| C | 200 | 0.5 | 0 |
| D | 400 | 0.75 | 0 |
| E | 300 | 0.75 | 0 |
| F | 400 | 1.0 | 0 |
| G | 300 | 1.0 | 0 |
| H | 200 | 1.0 | 0 |
| I | 400 | 0.75 | 5 |
| J | 400 | 0.75 | 10 |
| K | 400 | 0.75 | 15 |
| L | 400 | 1.0 | 5 |
| M | 400 | 1.0 | 10 |
| N | 400 | 1.0 | 15 |

Instrumentation

Coin cells were made from a film of oversized electrolyte sandwiched between ½" diameter lithium discs under internal pressure. Cells were heated to 60° C. and cycled at ±0.25 $mA/cm^2$ current density of an Arbin BT2043 battery tester. Cycling steps were 1 hour in length with a 15 minute rest or 3 hours in length with a 30 minute rest. A polarization limit of 2-Volt was included to minimize deterioration of the electrolyte. Resistance in the coin cell as measured by electrochemical impedance techniques, using a Solartron/Schlumberger model 1250 FRA and model 1286 Electrochemical Interface. Moisture content was measured using CA-1000 moisture meter connected to a VA-100 vaporizer from Mitsubishi Chemical.

Polymer Synthesis

The polymer electrolyte was synthesized according to Scheme 2. The reaction solvent was carefully chosen to serve several purposes. First, the solvent needs to have a high enough boiling point to provide a reaction temperature for imidization to occur as well as remove water that is formed as a bi-product. Second, the solvent needs to keep the polymer dissolved after imidization. Third, a solvent was desired that was volatile enough to be preferentially evaporated in the presence of cyclic carbonates like ethylene carbonate (EC, bp=243° C.) and propylene carbonate (PC, bp=240° C.).

Lastly, if the solvent is retained, it should be inert to any battery components, such as lithium metal or 3V cathodes. For the above reasons, diglyme (bp=162° C.), a low MW polyether was chosen. The diamine and dianhydride were reacted at about room temperature to form the polyamic acid oligomer, followed by heating to a bath temperature of 165° C. to imidize the oligomer. The oligomer remained in solution indefinitely as long as there is slight agitation of the solution. Without agitation, the solutions have been observed to gel after several days to several weeks.

Isocyanate groups are know to react with amines at ambient temperatures without forming any bi-products (eg. water). Scheme 2 shows the reaction of the triisocyanate with the amine endcapped oligomer. Lithium salt was typically dissolved in the polymer solution, followed by the addition of RTIL, carbonate solvent, or a combination of the two. As distinguished from some of the other ionic liquids, (RTIL) is added to the prepolymer solution subsequently to the imidization of the amic-acid prepolymer. The triisocyanate, dissolved in THF, was then added to the polymer solution, shaken vigorously, and cast into a film.

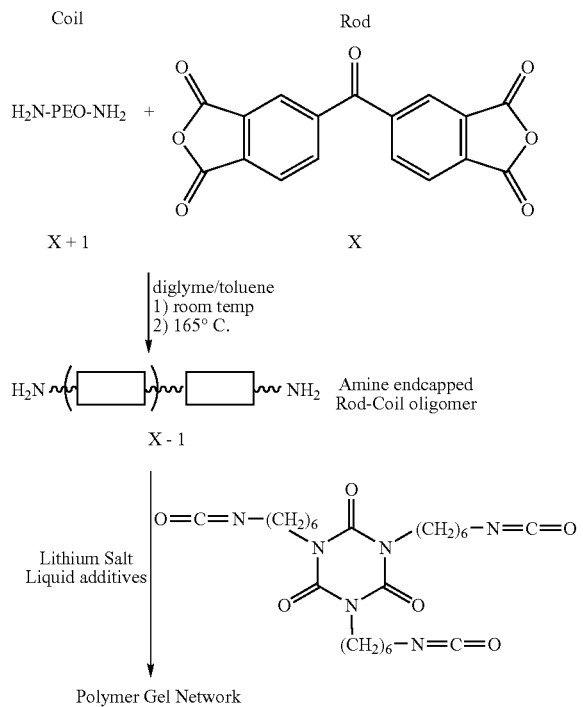

Gels typically formed in less that 5 minutes, which gives strong evidence for a rapid reaction between the amine and isocyanate groups. Furthermore, if the extra solvent or RTIL are not added, the solution will gel before it can be removed from the container. FIG. 1 shows infrared spectra of the triisocyanate, a polymer film without the triisocyanate added, and the polymer film when triisocyanate is added. The polymer shows two absorptions at 1771 and 171.4 cm$^{-1}$, typical of imide carbonyl absorptions. There is also a small absorption at 1669 cm$^{-1}$, which may correspond to a small amount of unreacted polyamic acid. The triisocyanate shows a characteristic isocyanate peak at 2265 cm$^{-1}$. This peak almost completely disappears on addition to the oligomer. Unfortunately, the triisocyanate also has three carbonyl groups, which likely are masked by a newly formed urea peak would be expected at ~1700 cm$^{-1}$. A small, broad peak also grows in a 1540 cm$^{-1}$. This peak is most likely due to the C—N—H bending vibration on the newly formed urea group.

The reaction also was run directly in $P_{13}$, both with a toluene azeotrope or by purging through a drying tube at elevated temperature. When the dianhydride was added to the diamine in $P_{13}$, a highly viscous solution formed, indicating polymerization. However, when the triisocyanate was added after imidization, the solution would not gel. Hunig and Baron have reported the dealkylation of quaternary ammonium salts, including pyrrolidinium salts, with ethanol amine at elevated temperatures. An analogous reaction may be taking place between $P_{13}$ and the amine endgroups.

Conductivity

Figure 2:
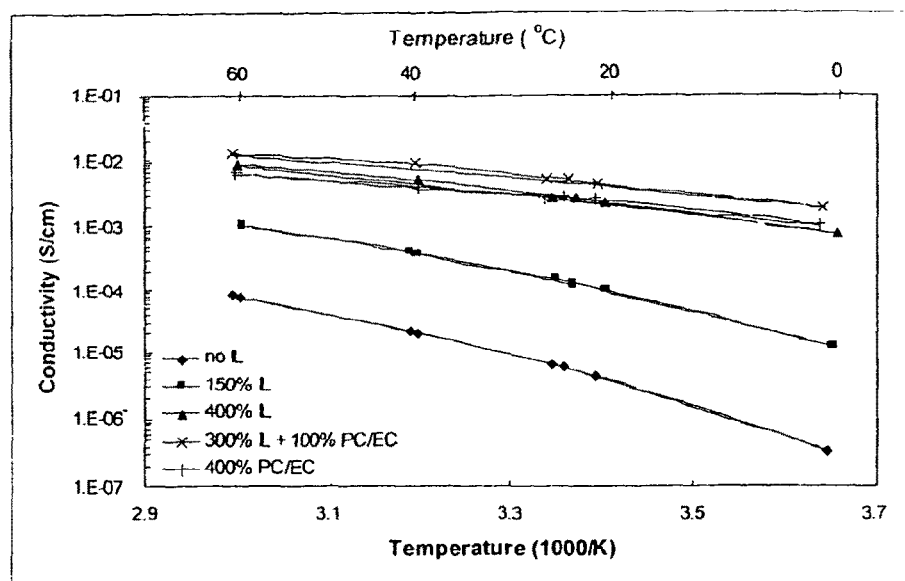
FIG. 2: shows the conductivity vs. temperature of various rod-coil polymer electrolytes imbibed with various amounts of ionic liquid (IL). Note: no IL and 150% IL electrolytes were prepared by a previous imidization method.

As expected, conductivity increases as more liquid is added. The bottom curve of FIG. 2 shows the conductivity of the rod-coil polyimide made by the previous high temperature imidization method, and with an oxygen to lithium ratio of 20:1. When 150% ionic liquid by weight is added to this polymer (0.5 mol/kg LiTFSi in $P_{13}$), the conductivity increases by over an order of magnitude. However, this appears to be the maximum amount of RTIL that can be added to this polymer. Even at this loading level, some liquid appears on the film surface after curing. A much higher volume of RTIL can be added to the rod-coil polyimide produced by this method. The top three curves show the conductivity in the new polymer electrolyte when 400% liquid (0.5 mol/kg) is added. Again, the conductivity increased by nearly an order of magnitude. The films which contained 400% $P_{13}$ and 400% 1:1 PC:EC was expected to be more conductive due to a lower solution viscosity, but this was not the case. The sample containing 400% $P_{13}$ may appear more conductive than expected since the RTIL ions contribute to conductivity as well. The most conductive electrolyte contained a 3:1 ratio of $P_{13}$ to 1:1 PC:EC, possibly due to a combination of the effects mentioned above.

Figure 3:
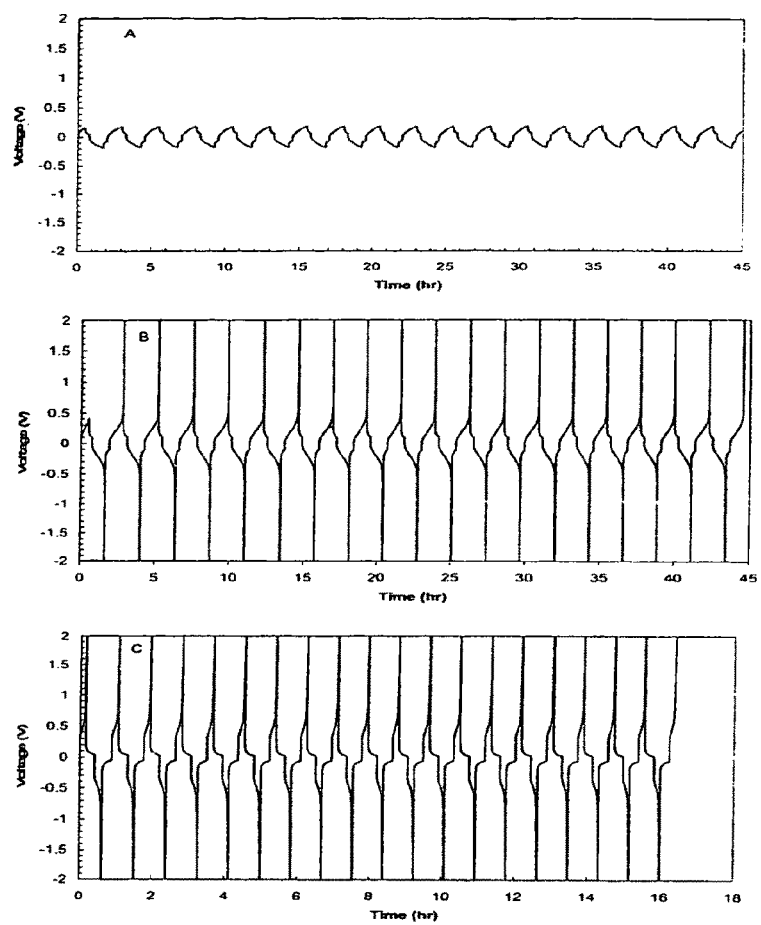
FIG. 3: shows the overvoltage vs. time plot of Li/electrolyte/Li coin cells of polymer electrolytes A (400% $P_{13}$, 0.5 mol/kg LiTFSi), B (300, 0.5) and C (200, 0.5) during galvanostatic stripping and plating at 60° C. and 0.25 mA/cm² current density.
Figure 4:
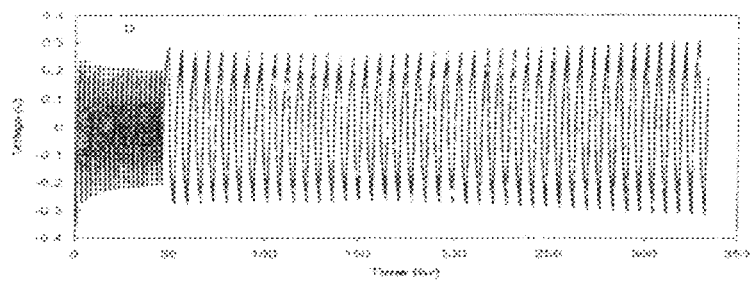
FIG. 4: shows the overvoltage vs. time plot of Li/electrolyte/Li coin cells of polymer electrolytes D (400% $P_{13}$, 0.75 mol/kg LiTFSi), E (300, 0.75) during galvanostatic stripping and plating at 60° C. and 0.25 mA/cm² current density.
Figure 4:
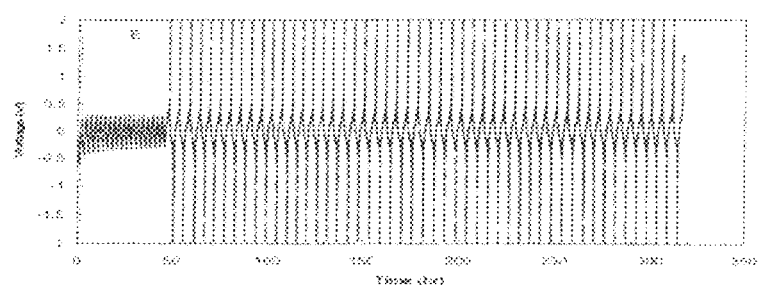

Effects of LiTFSi Concentration and Ionic Liquid to Polymer Ratio on Cycling Stability FIG. 3 shows the effect on cycling stability of adding various amounts of 0.5 mol/kg LiTFSi in $P_{13}$ to the polymer. At a current density of 0.25 mA/cm2 at 60° C. cells with 200 and 300% $P_{13}$ added polarized to the 2 volt cutoff within the first cycle, although the 300% sample does so more gradually. The cell with 400% $P_{13}$, however, lasts for 20 cycles at 60° C. When the step length is increased from 1 hour to 3 hours, this cell polarizes to the 2 volt cutoff in the first cycle. When the LiTFSi concentration was increased to 0.75 and 1.0 mol/kg in $P_{13}$ cycling stability improved. For these samples with higher salt concentration, cycling steps were increased from 1 hour to 3 hours after ~0.50 hours to accelerate testing. FIG. 4 shows cycling stability of electrolytes with 0.75 mol/kg salt concentration. The sample with 400% $P_{13}$ added remained stable after over 300 hours of testing, whereas the sample with 300% $P_{13}$ added polarized to the 2 volt limit when the step lengths were increased.

Figure 5:
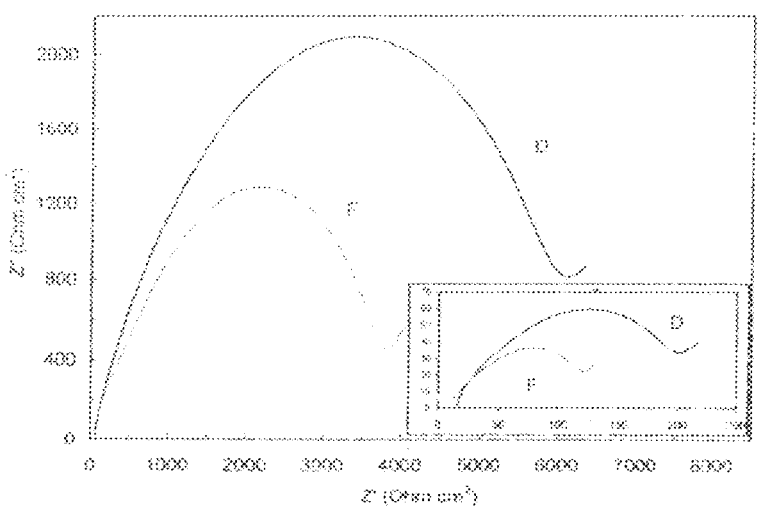
FIG. 5: shows the impedance spectra of electrolytes D (400% $P_{13}$, 0.75 mol/kg LiTFSi) and F (400, 1.0) at room temperature. Inset: Impedance at 60° C.

Impedance spectra were also taken to compare the bulk (left hand intercept) and interfacial (arc width) resistance of each electrolyte. FIG. 5 compares impedance spectra of coin cells that contain 400% $P_{13}$. The 0.75 and 1.0 mol/kg samples have a similar bulk resistance. However, the sample with the higher LiTFSi concentration shows lower interfacial resistance at both room temperature and 60° C. Overall, both galvanic cycling and impedance spectroscopy showed that electrolytes behaved best at both the highest salt concentration and highest amount of $P_{13}$ additive. Unfortunately, adding increasing amounts of RTIL and LiTFSi also make the polymer more difficult to work with. Electrolyte F was very tacky and broke inside the coin cell after 55 hours of testing. Visual inspection of the inside of the cell showed that the lithium was still shiny and no color change was observed in the electrolyte.

Effect of Alumina Addition on Cycling Stability

Figure 6:
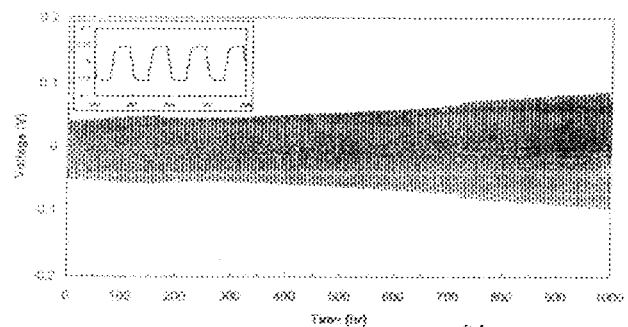
FIG. 6: shows the overvoltage vs. time plot of Li/electrolyte/Li coin cells of polymer electrolyte M (400% $P_{13}$, 1.0 mol/kg LiTFSi, 10% alumina) during galvanostatic stripping and plating at 60° C. and 0.25 mA/cm² current density. Inset: A closeup view of 4 cycles.
Figure 7:
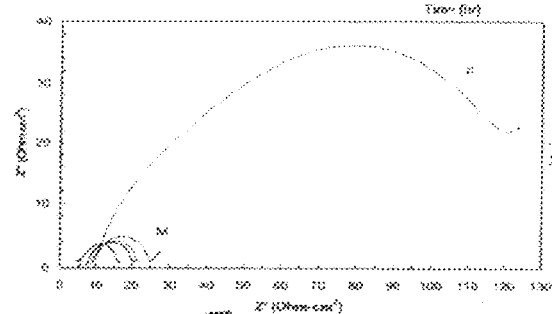
FIG. 7: shows the impedance spectra of Li/electrolyte/Li coin cells of electrolyte F (400% $P_{13}$, 1.0 mol/kg LiTFSi, 0% alumina) before cycling and electrolyte M (400, 1.0, 10) after (left to right) 0, 621, 813, and 1007 hours of cycling at 60° C.

Dramatic improvements to both mechanical properties and cycling stability were observed when even small amounts of alumina nanoparticles were added. Films were stronger and no longer tacky. FIG. 6 shows that when 10% alumina is added, initial cycling over voltage, and therefore resistance, decreases by nearly a factor of 10. In addition, this coin cell shows excellent cycling stability for over 1000 hours at 60° C. and 0.25 mA/cm² current density. This improvement is directly related to interfacial resistance. FIG. 7 compares impedance spectra of a polymer electrolyte without additives to the same electrolyte with 10% alumina added. Electrolyte F has lower initial interfacial impedance by a factor of 10, and remains much lower even after over 1000 hours of cycling. Addition of the nanoparticles may also improve lithium ion mobility. Ye and coworkers report that within a system of LiTFSi/$P_{13}$/PVDF(HFP). Li$^+$ is the smallest but least mobile ion. This is believed to be due to strong complexation and diffusion of Li$^+$ with the anion while the IL cation can move more freely.

Table 2 lists the interfacial resistance of several electrolytes at room temperature and 60° C. Interfacial resistance is much lower in all samples that contain alumina nanoparticles. The effect is so great that samples that contain alumina show lower interfacial resistance at room temperature than samples without alumina at 60° C. The resistance does not appear to depend on the alumina concentration between 5 and 15%. Improved interfacial stability has been observed previously between PEO and lithium electrodes when ceramic particles are added, but the reasons for this are not well understood. Possible explanations include shielding of the more reactive polymer from lithium metal with inert ceramic particles, scavenging effects of the nanoparticles to absorb reactive impurities (such as water), and improved electrolyte mechanical properties that produce a more ideal solid-solid interface with lithium. Subsequent analysis of several electrolytes revealed relatively high water contents (800-1800 ppm). Studies are underway to determine if cycling stability can be further improved by longer azeotrope times of vacuum drying of the final film. In this polymer system, alumina particles would have added effects of hydrogen bonding to urea groups to shield them from reacting with lithium and form pseudo-crosslinks with other urea groups.

TABLE 2

| Electrolyte | $R_{int\ rt\ °C.}$ ($\Omega$ cm²) | $R_{int\ 60°\ C.}$ ($\Omega$ cm²) |
|---|---|---|
| D | 6130 | 364 |
| E | 7330 | 337 |
| F | 3740 | 109 |
| G | 3890 | 158 |
| H | 4850 | 352 |
| I | 155 | 10.9 |
| J | 144 | 9.4 |
| K | 153 | 10.0 |
| L | 168 | 11.1 |
| M | 140 | 11.0 |
| N | 164 | 11.1 |

Figure 8:
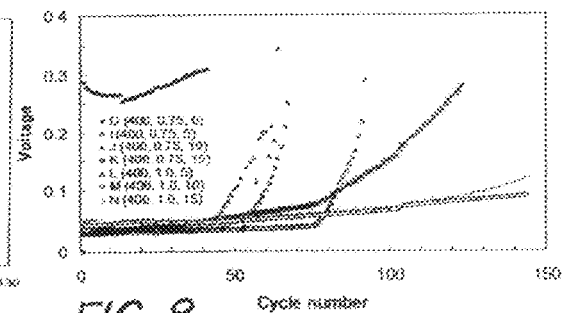
FIG. 8: shows the maximum voltage vs. cycle number during stripping and plating at 60° C. in various symmetric coin cells. % $P_{13}$, 1.0 mol/kg LiTFSi, and % alumina are shown in parentheses. Note: the cycles with 1 hr steps for the electrolyte D were not counted.

FIG. 8 shows the maximum overvoltage reached at the end of each cycle for several coin cells. The initial overvoltage values are much lower in all cells that contain alumina. In addition, cells that contained 1.0 mol/kg LiTFSI had better long term cyclability than cells with 0.75 mol/kg LiTFSI. Cells with 5% alumina added appeared to be less stable than cells with 10 and 15% alumina added.

Specifically, this invention discloses a novel crosslinked polymer that is capable of holding large amounts of liquid without leaking. An amine endcapped polyimide-PEO oligomer is first made that remains soluble in diglyme. The oligomer then reacts rapidly with a trifunctional compound e.g. triisocyanate molecule in the presence of liquid additives. The addition of carbonate solvents or ionic liquids increases the polymer conductivity by over 2 orders of magnitude. The electrochemical stability of several electrolytes with lithium metal electrodes was studied by varying the ratios of polymer, ionic liquid, lithium salt, and alumina. The most stable electrolyte that was studied contained 400% $P_{13}$, 1.0 mol/kg LiTFSi, and 10% alumina. This electrolyte exhibited stable cycling within symmetric coin cells for over 1000 hours at 60° C., 0.25 mA/cm² current density, and 3 hour steps. By comparison, initial electrolytes did not last for even 1 cycle under these conditions. The addition of only 5% alumina dramatically increases cycling stability and decreases interfacial resistance by nearly an order of magnitude.

The preferred polyimide—polyalkylene oxide copolymers of this invention are derived from dianhydrides and polyalkylene (PEO) oligomers terminated with aliphatic amines. The following are specific examples of tetracarboxylic acid dianhydrides that can be used for practicing this invention which includes: 2,3,3',4'-benzophenonetetracarboxylic acid dianhydride, 3,3',4,4'-benzophenonetetracarboxylic acid dianhydride, 2,2,3,3'-benzophenonetetracarboxylic acid dianhydride, 2,2',3,3'-biphenyltetracarboxylic acid dianhydride, 2,3,6,7-naphthalenetetracarboxylic acid dianhydride, 1,2,5,6-naphthalenetetracarboxylic acid dianhydride, benzene-1,2,3,4,-tetracarboxylic acid dianhydride, pryazine-2,3,5,6-tetracarboxylic acid dianhydride, and thiophene-2,3,4,5-tetracarboxylic acid dianhydride.

The tetracarboxylic dianhydrides are preferably selected from the group consisting of 3,3',4,4'-benzophenone tetracarboxylic dianhydride (BTDA); 1,1,1,3,3,3-hexafluororisopropylidene bisphthalic acid dianhydride (HFDA or 6FDA); 1,2,4,5-pyromellitic dianhydride (PMDA); 3,3',4,4'-oxydiphthalic dianhydride (OPDA); 3,3',4,4'-biphenyltetracarboxylic (OPDA) and 3,3',4,4'-biphenyltetracarboxylic dianhydride (BPDA).

The aliphatic diamines useful in preparing the branched rod-coil polyimide poly (alkylene oxide) copolymers can be characterized as having the formula:

For purposes of this invention, the preferred diamines are alkylene diamines wherein the alkylene group preferably has from 2 to 4 carbons such as polyoxyethylene diamine, polyoxypropylene diamine, polyoxybutylene diamine and mixtures thereof.

In preparing the branched rod-coil polyimide-poly(alkylene oxide) copolymers, and the polymer electrolyte compositions of this invention, the lithium compounds used as the electrolyte are dissolved in solvent. Although the solvents are not limited, the following examples include the carbonates, ethers, dimethoxyethane, butyl acetone, diethylether, tetrahydrofuran, methyl-tetrahydrofuran, dioxolan, acetonitrile, and particularly the lower alkyl carbonates such as ethylene carbonate, propylene carbonate, dimethyl carbonate, methylcarbonate, methylpropylcarbonate and the like.

The polyimide—poly (alkylene oxide) copolymer electrolyte compositions of this invention for use in fuel cells and lithium polymer batteries include one or more lithium compounds, preferably the salts such as $LiClO_4$, $LiBF_4$, $LiCl$, $LiSO_2CH_3$, $LiSO_3CF_3$, $LN(SO_2CF_3)_2$ and $LiC(SO_2CF_3)_3$ $LiI$, $LiPF_6$, lithium nitrate, lithium bromide and various combinations thereof in any ratio.

While this invention has been described with the preferred embodiments, it will be appreciated that various modifications and variations will be apparent to one skilled in the art and that such modifications and variations are within the scope of the appended claims.

The invention claimed is:

1. A branched rod-coil polyimide-poly (alkylene oxide) copolymer comprising:
   a primary amine-terminated poly (alkylene oxide) oligomers;
   dianhydrides reacted in solution and at ambient temperature with said oligomers to form linear amine-terminated polyamic-acid prepolymers and imidized in solution to form a polyimide solution;
   at least one additive dissolved in the polyimide solution; and
   a trifunctional compound subsequently added to the polyimide solution to react with the oligomer's amine end-caps at ambient temperatures to form a gel.

2. The copolymer of claim 1, wherein the at least one additive comprises Li salts, metals oxides, ionic liquids, carbonate solvents, or a combination thereof.

3. The copolymer of claim 2 wherein the amine-terminated poly (alkylene oxides) is an amine-terminated poly (ethylene oxide) oligomer.

4. The copolymer of claim 3 wherein the trifunctional compound is an isocyanate forming a solid polyimide-poly (ethylene oxide) copolymer electrolyte gel.

5. The copolymer of claim 4 wherein trifunctional compound is a combination of tri-isocyanates and di-isocyanates.

6. The copolymer of claim 2, wherein the at least on additive dissolved in the polyimide solution comprises an ionic liquid and alumina added at ambient temperature.

7. The copolymer of claim 6, wherein the ionic liquid (RTIL) comprises an organic carbonate solvent.

* * * * *